United States Patent Office 3,443,863
Patented May 13, 1969

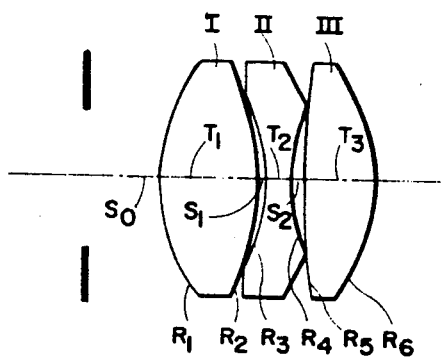

3,443,863
TRIPLET-TYPE OBJECTIVE LENS
Paul L. Ruben, Penfield, N.Y., assignor to Eastman Kodak Company, Rochester, N.Y., a corporation of New Jersey
Filed Jan. 23, 1967, Ser. No. 610,882
Int. Cl. G02b 9/14
U.S. Cl. 350—226       6 Claims

ABSTRACT OF THE DISCLOSURE

A photographic objective of the simple triplet type is disclosed which is well corrected for very high relative apertures, and is particularly suited for use in motion picture cameras.

---

This invention relates to improvements in photographic objectives of the simple triplet type having a high relative aperture.

An object of this invention is to provide an inexpensive simple triplet type of photographic objective having a relative aperture of $f/2.7$ which is well corrected for spherical and chromatic aberrations, coma, astigmatism, flatness of field, and is particularly suited for use on motion picture cameras.

Further objects and advantages will be found in the details of construction disclosed in the accompanying examples and drawing.

The present invention comprises triplet objectives having two outer positive elements and an inner negative biconcave element. The inner negative elements of the triplets of this invention are positioned close to the front positive elements, and in most of the embodiments disclosed below the front two elements have contacting edges. The thin airspace reduces spherical aberrations. The use of contacting edges provides easy and precise mounting, which is particularly critical when the airspaces are thin. Thin airspaces are sensitive to slight changes of thickness and consequently require close tolerance in mounting.

The drawing shows a cross sectional view of an objective embodying the invention with the long conjugate on the left.

The objective in the drawing comprises three airspaced simple lenses, designated I, II and III. The outer two lenses I and III are positive elements, and the inner lens II is a negative biconcave element. The diaphragm is located in front of lens I.

Numerical data for constructing six embodiments of photographic objectives according to the invention as outlined above is given in the following examples in which the lens elements are numbered from front to rear, N is the index of refraction of the lens elements for the D line, V is the index of dispersion, and R, T and S refer respectively to the radii of curvature of the lens surfaces, the thicknesses of the lens elements and the airspaces between the elements, numbered by subscript from front to rear.

EXAMPLE 1
Equivalent Focal Length = 100 mm.    $f/2.7$

| Lens | $N_D$ | V | Radii (mm.) | Thicknesses and Spacings (mm.) |
|---|---|---|---|---|
| Stop | | | | $S_0=31.2$ |
| I | 1.61 | 58.8 | $R_1=50.4$ | $T_1=28.6$ |
| | | | $R_2=-59.0$ | $S_1=1.61$ |
| II | 1.62 | 36.6 | $R_3=-46.6$ | $T_2=7.61$ |
| | | | $R_4=46.6$ | $S_2=6.84$ |
| III | 1.61 | 58.8 | $R_5=143$ | $T_3=20.2$ |
| | | | $R_6=-65.4$ | |

EXAMPLE 2
Equivalent Focal Length = 100 mm.    $f/2.7$

| Lens | $N_D$ | V | Radii (mm.) | Thicknesses and Spacings (mm.) |
|---|---|---|---|---|
| Stop | | | | $S_0=19.9$ |
| I | 1.61 | 58.6 | $R_1=52.1$ | $T_1=26.4$ |
| | | | $R_2=-75.6$ | $S_1=1.57$ |
| II | 1.61 | 37.0 | $R_3=-51.0$ | $T_2=7.15$ |
| | | | $R_4=51.0$ | $S_2=2.72$ |
| III | 1.61 | 58.6 | $R_5=270$ | $T_3=19.3$ |
| | | | $R_6=-53.2$ | |

EXAMPLE 3
Equivalent Focal Length = 100 mm.    $f/2.7$

| Lens | $N_D$ | V | Radii (mm.) | Thicknesses and Spacings (mm.) |
|---|---|---|---|---|
| Stop | | | | $S_0=20.8$ |
| I | 1.49 | 57.4 | $R_1=43.1$ | $T_1=21.5$ |
| | | | $R_2=-85.7$ | $S_1=1.57$ |
| II | 1.57 | 36.6 | $R_3=-58.0$ | $T_2=7.14$ |
| | | | $R_4=43.3$ | $S_2=4.14$ |
| III | 1.61 | 58.8 | $R_5=94.6$ | $T_3=20.0$ |
| | | | $R_6=-66.6$ | |

In the above three examples the inner negative element is in edge contact with both positive elements for easy mounting.

The elements in Examples 1 and 2 are all glass, but in the Example 3 embodiment of this invention, the front two components are formed from plastic and the third component is formed from glass. The use of plastic-glass combinations in triplets is disclosed in U.S. Patent 3,194,116 in which the negative element is formed from a copolymer of acrylonitrile and styrene having an index of refraction $N_D$ about 1.56 and an index of dispersion about 37. To balance the effect of thermal expansion, one of the positive elements can be formed from a plastic, preferably methyl methacrylate having an index of refraction $N_D$ about 1.49 and an index of dispersion about 57.

EXAMPLE 4

Equivalent Focal Length=100 mm.   f/2.7

| Lens | $N_D$ | V | Radii (mm.) | Thicknesses and Spacings (mm.) |
|---|---|---|---|---|
| Stop | | | | $S_0$=11.5 |
| I | 1.61 | 58.6 | $R_1$=39.2 | $T_1$=12.7 |
| | | | $R_2$=270 | |
| | | | | $S_1$=3.20 |
| II | 1.61 | 37.0 | $R_3$=−90.5 | $T_2$=6.15 |
| | | | $R_4$=39.2 | |
| | | | | $S_2$=4.38 |
| III | 1.61 | 58.6 | $R_5$=79.7 | $T_3$=9.66 |
| | | | $R_6$=−60.4 | |

EXAMPLE 5

Equivalent Focal Length=100 mm.   f/2.7

| Lens | $N_D$ | V | Radii (mm.) | Thicknesses and Spacings (mm.) |
|---|---|---|---|---|
| Stop | | | | $S_0$=18.4 |
| I | 1.75 | 50.6 | $R_1$=51.6 | $T_1$=29.0 |
| | | | $R_2$=−281 | |
| | | | | $S_1$=2.25 |
| II | 1.72 | 29.3 | $R_3$=−80.0 | $T_2$=5.00 |
| | | | $R_4$=45.2 | |
| | | | | $S_2$=9.71 |
| III | 1.75 | 50.6 | $R_5$=140.3 | $T_3$=12.6 |
| | | | $R_6$=−71.7 | |

The above two Examples 4 and 5 have only the front two components in edge contact. In Example 5, as well as Example 6 following, all elements are formed from glasses having high indices of refraction $N_D$ which reduces spherical aberration. In the Example 6 embodiment of the invention, none of the elements are in contact.

EXAMPLE 6

Equivalent Focal Length=100 mm.   f/2.7

| Lens | $N_D$ | V | Radii (mm.) | Thicknesses and Spacings (mm.) |
|---|---|---|---|---|
| Stop | | | | $S_0$=14.5 |
| I | 1.75 | 52.4 | $R_1$=54.7 | $T_1$=28.9 |
| | | | $R_2$=−313 | |
| | | | | $S_1$=5.0 |
| II | 1.72 | 29.3 | $R_3$=−69.3 | $T_2$=5.0 |
| | | | $R_4$=46.3 | |
| | | | | $S_2$=11.1 |
| III | 1.75 | 52.4 | $R_5$=140 | $T_3$=12.6 |
| | | | $R_6$=−62.0 | |

Although the invention has been described in considerable detail with reference to certain preferred embodiments thereof, it will be understood that variations and modifications can be effected without departing from the spirit and scope of the invention as described hereinabove.

What is claimed is:

1. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 58.8 | $R_1$=.504F | $T_1$=.286F |
| | | | $R_2$=−.590F | |
| | | | | $S_1$=.016F |
| II | 1.62 | 36.6 | $R_3$=−.466F | $T_2$=.076F |
| | | | $R_4$=.466F | |
| | | | | $S_2$=.068F |
| III | 1.61 | 58.8 | $R_5$=.143F | $T_3$=.202F |
| | | | $R_6$=−.654F | |

2. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 58.6 | $R_1$=.521F | $T_1$=.264F |
| | | | $R_2$=−.756F | |
| | | | | $S_1$=.016F |
| II | 1.61 | 37.0 | $R_3$=−.510F | $T_2$=.072F |
| | | | $R_4$=.510F | |
| | | | | $S_2$=.027F |
| III | 1.61 | 58.6 | $R_5$=2.70F | $T_3$=.193F |
| | | | $R_6$=−.532F | |

3. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.49 | 57.4 | $R_1$=.431F | $T_1$=.215F |
| | | | $R_2$=−.857F | |
| | | | | $S_1$=.016F |
| II | 1.57 | 36.6 | $R_3$=−.580F | $T_2$=.071F |
| | | | $R_4$=.433F | |
| | | | | $S_2$=.041F |
| III | 1.61 | 58.8 | $R_5$=.946F | $T_3$=.200F |
| | | | $R_6$=−.666F | |

4. A photographic objective of the simple triplet type having an equivalent focal length F and comprising two outer simple positive lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.61 | 58.6 | $R_1=.392F$ | $T_1=.127F$ |
|  |  |  | $R_2=2.70F$ | $S_1=.032F$ |
| II | 1.61 | 37.0 | $R_3=-.905F$ | $T_2=.062F$ |
|  |  |  | $R_4=.392F$ | $S_2=.044F$ |
| III | 1.61 | 58.6 | $R_5=.797F$ | $T_3=.097F$ |
|  |  |  | $R_6=-.604F$ |  |

5. A photographic objective of the simple triplet type having an equivalent focal length F and comprising two outer simple positive biconvex lens elements and an inner simple negative biconcave lens elements, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.75 | 50.6 | $R_1=.516F$ | $T_1=.290F$ |
|  |  |  | $R_2=-2.81F$ | $S_1=.023F$ |
| II | 1.72 | 29.3 | $R_3=-.800F$ | $T_2=.050F$ |
|  |  |  | $R_4=.452F$ | $S_2=.097F$ |
| III | 1.75 | 50.6 | $R_5=1.40F$ | $T_3=.126F$ |
|  |  |  | $R_6=-.717F$ |  |

6. A photographic objective of the simple triplet type having an equivalent focal length F and comprising two outer simple positive biconvex lens elements and an inner simple negative biconcave lens element, the lens elements having substantially the following characteristics and spatial relations in which the lens elements are numbered from the front, N is the index of refraction for the D line, V is the index of dispersion, and R, T and S refer respectively to the radii of curvature of the lens surfaces, the axial thicknesses of the lens elements, and the axial spacings between the lens elements, numbered by subscript from front to rear:

| Lens | $N_D$ | V | Radii | Thicknesses and Spacings |
|---|---|---|---|---|
| I | 1.75 | 52.4 | $R_1=.547F$ | $T_1=.289F$ |
|  |  |  | $R_2=-3.13F$ | $S_1=.050F$ |
| II | 1.72 | 29.3 | $R_3=-.693F$ | $T_2=.050F$ |
|  |  |  | $R_4=.463F$ | $S_2=.111F$ |
| III | 1.75 | 52.4 | $R_5=1.40F$ | $T_3=.126F$ |
|  |  |  | $R_6=-.620F$ |  |

References Cited

UNITED STATES PATENTS 3,359,057 12/1967 Ackroyd _____ 350—226

DAVID SCHONBERG, *Primary Examiner.*

RONALD J. STERN, *Assistant Examiner.*

U.S. Cl. X.R.

350—206

UNITED STATES PATENT OFFICE
CERTIFICATE OF CORRECTION

Patent No. 3,443,863                                            May 13, 1969

Paul L. Ruben

It is certified that error appears in the above identified patent and that said Letters Patent are hereby corrected as shown below:

Column 4, line 19, "$R_5 = .143F$" should read -- $R_5 = 1.43$ --.

Signed and sealed this 14th day of April 1970.

(SEAL)
Attest:

Edward M. Fletcher, Jr.                                  WILLIAM E. SCHUYLER, JR.

Attesting Officer                                                    Commissioner of Patents